United States Patent
Magiera et al.

(10) Patent No.: US 6,503,474 B1
(45) Date of Patent: Jan. 7, 2003

(54) PROCESS FOR THE PREPARATION OF ANHYDROUS SODIUM SULFIDE

(75) Inventors: Robert Magiera, Frankfurt (DE); Hans Christian Alt, Gelnhausen (DE); Gerhard Rasig, Hanau (DE); Jörg Münzenberg, Hanau (DE); Christoph Batz-Sohn, Hanau (DE); Ralf Goedecke, Rodenbach (DE); Ulrich Deschler, Sailauf (DE); Volker Knapp, Oberursel (DE); Karl-Heinz Rützel, Hürth (DE)

(73) Assignee: Degussa AG, Dusseldorf (DE)

( * ) Notice: Subject to any disclaimer, the term of this patent is extended or adjusted under 35 U.S.C. 154(b) by 0 days.

(21) Appl. No.: 09/633,268

(22) Filed: Aug. 4, 2000

Related U.S. Application Data

(63) Continuation-in-part of application No. 09/210,623, filed on Dec. 14, 1998, now abandoned.

(30) Foreign Application Priority Data

Dec. 16, 1997 (DE) .......................... 197 55 760

(51) Int. Cl.⁷ .......................... C01B 17/22; C01B 17/38
(52) U.S. Cl. .................................. 423/566.2
(58) Field of Search .................... 423/566.2; 23/295 R, 23/302 T

(56) References Cited

FOREIGN PATENT DOCUMENTS

| | | |
|---|---|---|
| DE | 1016242 | 3/1958 |
| EP | 0 345 136 A1 | 12/1989 |
| EP | 0 345 136 B1 | 12/1989 |
| EP | 0 361 998 A1 | 4/1990 |
| EP | 0 361 998 B1 | 4/1990 |
| JP | 6298502 A | 10/1994 |
| JP | 6298503 A | 10/1994 |
| JP | 6305716 A | 11/1994 |
| JP | 6305717 A | 11/1994 |

OTHER PUBLICATIONS

Krauss Maffei Verfahrenstechnik, pp. 2–12, 7/92, Printed in the Federal Republic of Germany.

German Patent Office communication dated Jul. 13, 1998.

Perry et al. "Chemical Engineers' Handbook" (5th ed.) McGraw–Hill Book Co. USA, ISBN 0–07–049478–9, p. 20–17 (1973).*

U. S. Published Patent Application No. 20010033824 A1 published Oct. 25, 2001.*

* cited by examiner

Primary Examiner—Stanley S. Silverman
Assistant Examiner—Timothy C. Vanoy
(74) Attorney, Agent, or Firm—Smith, Gambrell & Russell

(57) ABSTRACT

A process is disclosed for the preparation of anhydrous sodium sulfide by heating sodium sulfide having a water content of from 38 to 40% in a contact drier in vacuo, the temperature of the solid to be dried being increased from approximately 20° C. at the solid inlet to $\geq 180$° C. at the solid outlet.

25 Claims, No Drawings

PROCESS FOR THE PREPARATION OF ANHYDROUS SODIUM SULFIDE

CONTINUING APPLICATION DATA

This application is a continuation-in-part of co-pending U.S. patent application Ser. No. 09/210,623, filed Dec. 14, 1998, now abandoned. This parent application is entirely incorporated herein by reference.

INTRODUCTION AND BACKGROUND

The present invention relates to the preparation of anhydrous sodium sulfide by heating water-containing sodium sulfide under reduced pressure.

Processes for preparing an anhydrous sodium sulfide from $Na_2S.9H_2O$, $Na_2S.6H_2O$ or $Na_2S.5H_2O$ are already known from the prior art.

According to EP-B-0345 136, the monohydrate is prepared in the first dehydration step. The elimination of water requires a time of 2 hours or more.

The remaining water contained in the monohydrate is then removed at a temperature of from 90 to 200° C. and under a reduced pressure of approximately from 2.66 kPa (20 torr) to 66.5 kPa (500 torr).

A similar, two-step process for the preparation of crystalline anhydrous sodium sulfide is described in EP-B 0361 998.

The disadvantage of those known processes is that it is necessary to wait for the reaction in the first step, for example to the monohydrate, to be complete (EP-B-0345 136) before this compound can be conveyed to the second temperature step.

A product that is available commercially is a water-containing sodium sulfide having an $Na_2S$ content of especially from 60 to 62%. According to stoichiometric calculation, that corresponds approximately to $Na_2S.3H_2O$.

The introduction of hydrogen sulfide into concentrated sodium hydroxide solution yields, at temperatures above 100° C., a sodium sulfide hydrate melt having a content of approximately from 60% to 62% $Na_2S$.

The melt is placed on a cooling conveyor, on which it solidifies (T<90° C.). Comminution generally yields a flaky product, which is then available commercially.

The object of the invention is to provide a process by means of which there is obtained a sodium sulfide that is anhydrous to the greatest possible extent.

SUMMARY OF THE INVENTION

The invention provides a process for the preparation of anhydrous sodium sulfide by heating water-containing sodium sulfide under reduced pressure, characterized in that sodium sulfide having a water content of from 35 to 45%, especially from 38 to 40%, is conveyed, with mixing, through an apparatus in which the temperature of the $Na_2S$ hydrate that is fed in (product temperature) rises continuously from approximately 20° C. at the point at which the solid is fed in to $\geq 180°$ C. at the solid outlet, and a low pressure of <20 torr is maintained simultaneously. In this manner, the undesired melting of the material that is to be dehydrated is prevented.

A pressure of <11 torr is preferably maintained during the dehydration process.

For the process according to the invention there are used especially contact driers.

The time interval to complete the drying process of the invention is both a significant and unexpected improvement over the drying processes known in the prior art. By varying the conditions of vacuum, temperature and pressure according to the invention, the dwell time can be adjusted to complete a full cycle in less than 4 hours, and can be as low as 10 minutes. Intermediate time intervals embrace 3.5 hours, 3.0 hours, 2.5 hours, 2.0 hours, 1.5 hours, 1.0 hour or 30 minutes.

These dwell times can be completed on large and small throughput masses of sodium sulfide. A preferable throughput rate is 300 to 400 kg/h. Although this drying cycle can be accomplished at rates of 250 kg/h, 200 kg/h, 150 kg/g, 100 kg/h, 50 kg/h, 25 kg/h and lower according to the invention; it is also possible to accomplish complete drying when the mass throughput is higher than 400 kg/h by scaling up the drier apparatus to accommodate the higher mass flows. Complete and rapid drying at throughput rates can be accomplished at higher mass flows including 500 kg/h, 600 kg/h, 800 kg/h, 1000 kg/h, 1500 kg/h, 2000 kg/h, 4000 kg/h, 10,000 kg/h, 25,000 kg/h, 50,000 kg/h, 100,000 kg/h and higher.

DETAILED EMBODIMENT OF INVENTION

Contact driers are to be understood as being apparatuses in which the heat from a heating surface is transferred to the solid that is in contact with this surface. Thus, the process of the invention can be understood to involve the preparation of anhydrous sodium sulfide by heating water-containing sodium sulfide having a water content of from 35 to 45% by conveying the sodium sulfide with mixing, in contact with a heated surface and transferring heat to said sodium sulfide in contact with said surface so as to raise the temperature of said sodium sulfide continuously from approximately 20° C. at the point at which the sodium sulfide contacts the heated surface up to $\geq 180°$ C. where the sodium sulfide leaves the heated surface, at a low pressure of <20 torr, preferably <11 torr, which is maintained throughout the heating.

Such apparatuses include, for example, paddle driers and plate driers, the former generally being operated discontinuously and the latter continuously.

Plate driers that are installed vertically have proved to be especially suitable.

In these apparatuses, the plates, which are arranged from top to bottom, are combined into three or more sets of plates of different temperature zones. The solid temperature in the first set after the point at which the solid is fed in is from 20 to 70° C., and the solid temperature (product temperature) in front of the solid outlet is greater than 180° C.

It is a feature of the invention, that the heated surface can be in the form of a plurality of plates that are combined into sets assigned to three or more temperature zones. The heat is controlled so that the temperature of the sodium sulfide in the first set (after the point at which the solid is fed in) is from 20 to 70° C. and the temperature of the sodium sulfide in front of the solid outlet at the end of the heating zone is greater than 180° C.

The water-containing $Na_2S$ is preferably used in the form of scales, lamellae or flakes having an edge length of from 5 to 8 mm.

According to the invention it is possible to markedly reduce the dwell time of the sodium sulfide that is to be dehydrated in the drying process as compared with the prior art, and to make available a dehydration process which may be carried out discontinuously and, preferably, continuously.

Especially where a vacuum plate drier is used in continuous operation, the process yields an anhydrous sodium sulfide having a content of at least 98 wt. %, preferably 99 wt. %, Na$_2$S even after dwell times in the drier of ≧90 minutes.

EXAMPLE

A mass flow of from 300 to 400 kg/h of Na$_2$S having a water content of from 38 to 40 wt. % is fed in the form of flakes having an edge length of from 5 to 8 mm into a vacuum plate drier in which a vacuum of <15 mbar is maintained. The crude product passes through the drier in a meandering manner from top to bottom, during which it is heated and gives up the water bound in the form of the hydrate.

The following marginal conditions apply:

The individual heating plates are combined to form three sets of plates, the solid temperature in the uppermost set of plates rising from approximately 20° C. to approximately 70° C. and the temperature of the solid as it emerges at the solid outlet at the end of the third set being ≧180° C. The passage time through the drier is ≧90 minutes.

The starting compounds, or the products that are drying, are regularly rearranged on the plates.

In this manner, a product having a content of more than 99 wt. % Na$_2$S is obtained.

Further variations and modifications of the foregoing will be apparent to those skilled in the art and are intended to be encompassed by the claims appended hereto.

German priority application 197 55 760.0 is relied on and incorporated herein by reference.

We claim:

1. A process for the preparation of anhydrous sodium sulfide comprising:

heating water-containing sodium sulfide having a water content of from 35 to 45% by conveying said sodium sulfide with mixing, through a drier apparatus in which the temperature of the sodium sulfide rises continuously from approximately 20° C. at the point at which the sodium sulfide is fed in to said drier up to ≧180° C. at the point of the outlet, at a low pressure of <20 torr maintained in the process, wherein a drying cycle of any given part of the sodium sulfide is completed within a time interval of less than about 4 hours, and wherein the mass flow of the sodium sulfide in said process is more than about 25 kg/h.

2. The process according to claim 1 wherein the pressure is <11 torr.

3. The process according to claim 1, wherein the drier is a contact drier.

4. The process according to claim 1 wherein the drier is a paddle drier.

5. The process according to claim 1 wherein the drier is a plate drier.

6. The process according to claim 5, wherein the plate drier has plates that are combined into sets operated at three or more temperature zones, the temperature of the sodium sulfide in the first set after the point at which the sodium sulfide is fed in being from 20 to 70° C. and the temperature of the sodium sulfide in front of the outlet being greater than 180° C.

7. The process according to claim 1 wherein the water-containing sodium sulfide is in comminuted form.

8. The process according to claim 7 wherein the sulfide is in the form of scales, lamellae or flakes having an edge length of from 5 to 8 mm.

9. The process according to claim 1 wherein an anhydrous sodium sulfide having a content of at least 98 wt. % Na$_2$S, is produced.

10. The process according to claim 1 wherein an anhydrous sodium sulfide having a content of at least 99 wt. % Na$_2$S, is produced.

11. The process according to claim 1 wherein the process is carried out continuously.

12. The process according to claim 1 wherein the process is carried out discontinuously.

13. A process for the preparation of anhydrous sodium sulfide comprising:

heating water-containing sodium sulfide having a water content of from 35 to 45% by conveying said sodium sulfide with mixing, in contact with a heated surface and transferring heat to said sodium sulfide in contact with said surface so as to raise the temperature of said sodium sulfide continuously from approximately 20° C. at the point at which the sodium sulfide contacts the heated surface up to ≧180° C., at a low pressure of <20 torr, which is maintained during the heating wherein a drying cycle of any given part of the sodium sulfide is completed within a time interval of from 10 minutes to less than 4 hours, and wherein the mass flow rate of the sodium sulfide in contact with the heated service is within the range of 25 kg/h to 100,000 kg/h.

14. The process according to claim 13, wherein the heated surface has a plurality of plates that are combined into sets operated at three or more temperature zones, wherein the temperature of the sodium sulfide in the first set is from 20 to 70° C. and the temperature of the sodium sulfide in the last set is greater than 180° C.

15. The process according to claim 13, wherein the mass flow rate of the sodium sulfide through the dryer is within the range of 25 kg/h to 300 kg/h.

16. The process according to claim 13, wherein the mass flow rate of the sodium sulfide through the dryer is within the range of 300 kg/h to 400 kg/h.

17. The process according to claim 13, wherein the mass flow rate of the sodium sulfide through the dryer is within the range of 400 kg/h to 2,000 kg/h.

18. The process according to claim 13, wherein the mass flow rate of the sodium sulfide through the dryer is within the range of 2,000 kg/h to 100,000 kg/h.

19. The process according to claim 13, wherein the drying cycle occurs within a time interval of from 10 minutes to 30 minutes.

20. The process according to claim 13, wherein the drying cycle occurs within a time interval of from 30 minutes to 1.0 hour.

21. The process according to claim 13, wherein the drying cycle occurs within a time interval of from 1.0 hour to 2.0 hours.

22. The process according to claim 13, wherein the drying cycle occurs within a time interval of from 2.0 hours to 4.0 hours.

23. The process according to claim 16, wherein the drying cycle occurs within a time interval of from 30 minutes to 1.0 hour.

24. The process according to claim 16, wherein the drying cycle occurs within a time interval of from 1.0 hour to 2.0 hours.

25. The process according to claim 16, wherein the drying cycle occurs within a time interval of from 2.0 hours to 4.0 hours.

* * * * *